United States Patent Office 3,257,330
Patented June 21, 1966

3,257,330
COLORED, SOLID, SUBSTANTIALLY SPHERICAL GEL PARTICLES AND METHOD FOR FORMING SAME
Alfred J. Burzynski and Robert E. Martin, Toledo, Ohio, assignors to Owens-Illinois Glass Company, a corporation of Ohio
No Drawing. Filed Mar. 25, 1963, Ser. No. 267,785
8 Claims. (Cl. 252—316)

The present invention relates to a method for producing substantially spherical polysiloxane gel particles which contain a coloring agent. In particular, this invention relates to a method for preparing solid, substantially spherical organopolysiloxane particles which contain a dye or pigment.

This application is a continuation-in-part of application Serial No. 127,478, filed July 28, 1961, that is now abandoned, but the subject matter disclosed therein is now disclosed and claimed in our copending application Serial No. 384,766, filed July 24, 1964. The parent application disclosed a process for forming substantially spherical particles by emulsion polymerization of a compound of the formula

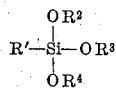

wherein R' represents an alkyl or alkenyl radical which contains less than five carbon atoms, and $R^2$, $R^3$ and $R^4$ represent independently methyl or ethyl radicals. Representative compounds of the cited formula are methyltrimethoxysilane, methyltriethoxysilane, ethyltrimethoxysilane, ethyltriethoxysilane, ethyldimethoxyethoxysilane, propyltrimethoxysilane, (1 - methylethyl)triethoxysilane, butyltriethoxysilane, (1 - methylpropyl)trimethoxysilane, (1,1-dimethylethyl)dimethoxyethoxysilane, vinyltriethoxysilane, propenyltrimethoxysilane, allyltriethoxysilane, and crotyltriethoxysilane. The process described involves hydrolysis of the organotrialkoxysilane in an aqueous medium at neutral or acidic pH, followed by agitation of the resultant mixture in the presence of an emulsifier to give organopolysiloxane beads about 1 micron to 1.5 millimeters in diameter. Optional modifications of the process include maintenance of temperatures above 30° C. and a pH below 6 during the hydrolysis step, addition of base to the hydrolysate to a pH of 7 to 9, and subsequent maintenance of a temperature of about 60° to 90° C. until the beads harden.

The reactions which occur can be envisioned as hydrolysis of the organotrialkoxysilane

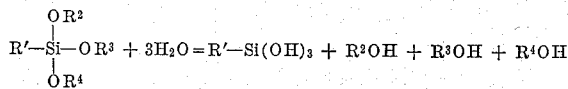

followed by condensation of the resultant organosilanetriol to an extensively cross-linked organopolysiloxane gel. The combined effect of agitation and the presence of an emulsifier during the condensation step causes the organopolysiloxane molecules to become isolated as essentially spherical droplets as they attain colloidal dimensions, which promotes subsequent cross-linking to form beads. The absence of agitation or an emulsifier leads to extensive intermolecular condensation, and consequent formation of large, irregularly shaped gel particles. The course of the reaction can usually be followed visually: the initially cloudy reaction mixture becomes clear due to the heightened solubility of the silane components in the alkanol-water medium which forms during hydrolysis; as the incipient organopolysiloxane droplets achieve colloidal dimensions, the solution clouds again, and the small gel spheres progressively harden to beads.

The present invention provides a process for the incorporation of an oil-soluble or alcohol-soluble dye or a pigment into organopolysiloxane beads derived from organotrialkoxysilanes of the formula

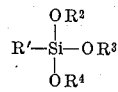

as defined above, by addition of the dye or pigment to a reaction mixture from which beads will be formed, at any time prior to substantial hardening of the beads. The beads thus prepared are useful as pigments in water and oil based paints, and in signs and highway markings.

It is therefore an object of the present invention to provide a method for producing colored organopolysiloxane beads.

It is a further object of this invention to provide a method for producing substantially spherical, uniform particles of an organopolysiloxane gel which contain a dye or pigment.

It is a still further object of this invention to provide a method for incorporating a dye or pigment into organopolysiloxane beads about 1 micron to 1.5 millimeters in diameter.

According to the present invention a compound of the formula

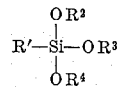

as previously defined, in admixture with an aqueous medium which has a neutral or acidic pH is agitated until the initially two-phase mixture is clear, is then further agitated in the presence of an emulsifying agent until water-immiscible droplets form, and is then still further agitated in the presence of a coloring agent until the droplets harden into substantially spherical solid gel particles which contain the coloring agent. It will be understood that the coloring agent can be provided in the reaction medium at any time before the droplets have substantially hardened.

According to the usual embodiment of the present invention, a compound of the formula

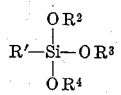

as previously defined, in admixture with an emulsifying agent, an oil-soluble or alcohol-soluble dye or a pigment, and an aqueous medium with a pH below 6, is stirred at a temperature above 30° C. until the initially cloudy mixture is clear, and further stirred until oily droplets form; base is added until the mixture thus obtained has a pH of about 7 to 9; and stirring is continued at temperatures in the range from 40° to 90° C. until the droplets harden into substantially spherical, solid, gel particles which contain the dye.

The usual methods of dyeing with acidic or basic dyes, vat dyeing, mordant dyeing, substantive dyeing, and dye formation by in situ diazotization and coupling, possess the common feature that the dye is combined with a pre-existing substrate. The process of the present invention differs from these methods in that the dye is incorporated by in situ formation of the substrate, organopolysiloxane beads, in a medium which contains the dye. The nature of the forces which hold the dye in the product beads is not known, but it is probable that a combination of van der Waals forces, hydrogen bonds, and simple steric inclusion are involved, and that the predominant binding factor depends on the nature of the particular dye. The common dye-substrate complex which is most analogous to that of the present invention is probably the solid solution formed when cellulose acetate or nylon is dyed in an aqueous dispersion of a water-insoluble azo or anthraquinone dye in the presence of a soap.

Acidification of the initial reaction mixture can be accomplished by using organic or inorganic acids, such as acetic acid, benzoic acid, oxalic acid, succinic acid, hydrochloric acid, sulfuric acid, and nitric acid. When base is used, it can be an organic or inorganic base, such as triethylamine, pyridine, trimethylbenzylammonium hydroxide, ammonium hydroxide, sodium hydroxide, calcium hydroxide, and barium hydroxide.

The nature and amount of the particular emulsifier used varies with the proportions of the other reagents employed, and is best determined empirically in a given experiment by routine test. The quantity of emulsifier employed must be sufficient to protect the droplets during hardening so that they do not agglomerate to form irregular organopolysiloxane gel particles. The emulsifier must be water-soluble, and it can be nonionic, anionic or cationic. Suitable types of emulsifiers are watersoluble salts of fatty acids; alkyl sulfates, such as sodium lauryl sulfate and sodium cetane sulfate; alkyl and alkaryl sulfonates, such as a sodium alkyl naphthalene sulfonate, and potassium dodecylbenzene sulfonate; polyethylene glycol lauryl ether and diethylene glycol monostearate; the condensation products of an alkylene oxide with alcohols, mercaptans, phenols or organic acids, such as the polyethylene glycol ester of abietic acid and the condensation product of n-dodecylmercaptan with ethylene oxide; sorbitan monopalmitate and sorbitan monooleate; block polymers of polypropylene glycol chains and polyethylene glycol chains with a molecular weight of at least about 2000 with about equal portions of the molecular weight in the polypropylene glycol and polyethylene glycol portions; cetyldimethylethylammonium bromide and cetyldimethylbenzylammonium chloride; and the nonylphenyl ether of polyethylene glycol. It will be understood that the use of a particular emulsifier is obviated if its structural characteristics which impart emulsive ability are destroyed in the reaction mixture. Thus, alkali metal salts of fatty acids are not useful in markedly acidic solutions, since they are converted largely to the non-ionized form of the acid, which is not an emulsifying agent.

Suitable dyes for use in the process of the present invention include triarylamine dyes, such as mauveine, psuedomauveine, and safranine T; triarylmethane dyes, such as rosaniline, Malachite Green, and aurintricarboxylic acid; phthalein dyes, such as fluorescein and eosin; cyanine dyes such as 1,1'-diethyl,4,4'-cyanine, 1,1',6-trimethylisocyanine iodide, and psuedocyanine; anthraquinoid dyes, such as alizarin, alizarin blue, and Anthracene Blue WSR; indigoid dyes such as indigo, thioindigo, and Indigo Yellow 3G; Flavanthrone and Violanthrone; sulfur dyes such as Immedial Pure Blue; azo dyes, such as Scarlet Red, Amaranth, and Congo Red; and phthalocyanines, such as copper phthalocyanine.

The optional modifications of the process of the present invention are those already cited for the parent application. Thus, it is favorable but not necessary to increase the over-all rate of bead formation by maintaining a pH below 6 and a temperature above 30° C. during the initial hydrolysis, and a pH of 7 to 9 and a temperature of 60° to 90° C. after droplets form and until they harden to beads. Increased rate of agitation, increased concentration of emulsifier, and decreased concentration of the organotrialkoxysilane usually causes a decrease in the size of the beads formed. Although larger or smaller beads can be obtained by suitable control of the named variables, those usually obtained are in the range of about 1 micron to about 1.5 millimeters in diameter.

The following examples further illustrate specific embodiments of the present invention. Dyes and pigments whose designation includes Rila in the following examples were obtained from Rhode Island Laboratories, Inc., West Warwick, Rhode Island.

Example 1

A. In a 300-ml. beaker equipped with a magnetic stirrer were placed 40 ml. of redistilled commercial ethyltriethoxysilane, 75 ml. of distilled water, 5 g. of Tergitol NPX (nonylphenyl ether of polyethylene glycol), and enough dilute hydrochloric acid to make the mixture acidic to litmus. The mixture thus obtained was heated to 65° C. until it turned clear, and then cooled to room temperature. To the resultant solution was added triethylamine until the mixture was basic to litmus; the mixture became cloudy, and about 0.5 g. of Sudan IV (Scarlet Red) was added. The resultant mixture was heated and stirred until the temperature reached 70° C., and then allowed to cool to room temperature, to give uniform, substantially spherical, red organopolysiloxane beads. The beads were removed from the residual reaction mixture by filtration, washed with water and acetone, and air dried. The beads thus obtained were stable to 200° C.

B. Substitution of 0.5 g. of Violite Luminescent Pigment, No. 200 Green (Rila) for the Sudan IV of Example 1A gave, by the procedure therein described, uniform organopolysiloxane beads about 0.5 mm. in diameter, which emitted a green light in the dark.

C. Substitution of 0.1 g. of fluorescein for the Sudan IV of Example 1A gives, by the procedure therein described, organopolysiloxane beads which exhibit a yellow fluorescence.

Example 2

A. Substitution of 40 ml. of methyltriethoxysilane for the ethyltriethoxysilane and 0.1 g. of fluorescein for the Sudan IV of Example 1A gives, by the procedure therein described, organopolysiloxane beads which exhibit a yellow fluorescence.

B. Substitution of 40 ml. of methyltrimethoxysilane for the ethyltriethoxysilane and 0.5 g. of Rila Luminescent Yellow for the Sudan IV of Example 1A gives, by the procedure therein described, organopolysiloxane beads which exhibit a yellow fluorescence.

Example 3

A. Substitution of 40 ml. of (1-methylpropyl)-trimethoxysilane for the ethyltriethoxysilane and 0.5 g. of Acetosol Blue GLS for the Sudan IV of Example 1A gives, by the procedure therein described, organopolysiloxane beads which possess a strong blue coloration.

B. Substitution of 40 ml. of butyltriethoxysilane for the ethyltriethoxysilane of Example 1A gives, by the procedure therein described, bright red organopolysiloxane beads.

Example 4

A. In a 300-ml. beaker equipped with a magnetic stirrer were placed 40 ml. of vinyltriethoxysilane, 75 ml. of distilled water, 5 g. of Tergitol NPX, and enough dilute hydrochloric acid to make the mixture acidic to litmus. The mixture thus obtained was heated to 65° C. until it turned clear, and then cooled to room temperature. To the resultant solution was added triethylamine until the mixture was basic to litmus; the mixture became cloudy, and about 0.05 g. of Solfast Blue G was added. The resultant mixture was heated and stirred until the temperature reached 60° C., and then allowed to cool to room temperature, to give uniform, substantially spherhical, blue organopolysiloxane beads. The beads were removed from the residual reaction mixture by filtration, washed was water and acetone, and air-dried. About 1-g. samples of the beads were placed in each of three test tubes which also contained acetone, dioxane, and benzene; after standing for 24 hours, none of the color had visibly leached into the solvent.

B. Substitution of 0.2 g. of Acetosol Blue GLS for the Solfast Blue G of Example 4A gave, by the procedure therein described, blue organopolysiloxane beads.

C. Substitution of 0.1 g. of Acetosol Violet 2 RLS for the Solfast Blue G of Example 4A gave, by the procedure therein described, medium violet organopolysiloxane beads.

D. Substitution of 1.5 g. of Violite Luminescent Pigment No. 200 Green (Rila) for the Solfast Blue G and ammonium hydroxide for triethylamine of Example 4A gave, by the procedure therein described, luminescent organopolysiloxane beads.

E. Substitution of 0.1 g. of Rila Luminescent Green for the Solfast Blue G and ammonium hydroxide for the triethylamine of Example 4A gave, by the procedure therein described, light luminescent green organopolysiloxane beads.

F. Substitution of 0.1 g. of fluorescein for the Solfast Blue G of Example 4A gave, by the procedure therein described, fluorescent yellow organopolysiloxane beads.

G. In a 1-liter beaker equipped with a magnetic stirrer were placed 30 g. of Tergitol NPX, 450 ml. of distilled water, and enough dilute hydrochloric acid to make the resultant solution acid to litmus. Then 240 ml. of vinyltriethoxysilane was added, and the resultant mixture was heated to 50° C., whereupon it turned clear. 1.2 g. of Rila Luminescent Yellow was added, and the mixture thus obtained was allowed to cool to room temperature. Enough triethylamine was added to make the mixture slightly basic to litmus, and the resultant reaction mixture was heated with stirring to about 60° C., whereupon beads formed and hardened. The beads thus obtained were removed by filtration, washed with water and acetone, and air dried.

H. Substitution of 1.2 g. of Rila Luminescent Red for the Rila Luminescent Yellow of Example 4G gave, by the procedure therein described, red organopolysiloxane beads.

Example 5

A. Substitution of 40 ml. of allyltriethoxysilane for the vinyltriethoxysilane of Example 4A gives, by the procedure described therein, blue organopolysiloxane beads.

B. Substitution of 40 ml. of allyltrimethoxysilane for the vinyltriethoxysilane and Sudan IV for the Solfast Blue G of Example 4A gives, by the procedure therein described, red organopolysiloxane beads.

Example 6

A. Substitution of 40 ml. of crotyltriethoxysilane for the vinyltriethoxysilane and Sudan IV for the Solfast Blue G of Example 4A gives, by the procedure therein described, red organopolysiloxane beads.

B. Substitution of 40 ml. of crotyltrimethoxysilane for the vinyltriethoxysilane and Acetosol Violet 2 RLS for the Solfast Blue G of Example 4A gives, by the procedure therein described, medium violet organopolysiloxane beads.

As will be evident to those skilled in the art, modifications of this invention can be made or followed in the light of the foregoing disclosure without departing from the spirit and scope of the disclosure or from the scope of the claims.

We claim:
1. A method for forming colored, solid, substantially spherical gel particles which consists essentially of mixing with agitation an organotrialkoxysilane of the formula

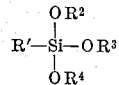

wherein R' is selected from the group which consists of alkyl and alkenyl radicals of less than five carbon atoms, and $R^2$, $R^3$ and $R^4$ represent radicals independently selected from the group which consists of methyl and ethyl radicals, an aqueous medium having a pH below 6, and an emulsifying agent, at an elevated temperature of above 30° C. until the mixture becomes clear, cooling the mixture to room temperature, adding a base to provide a pH of the mixture of about 7 to 9 whereby the mixture becomes cloudy due to formation of droplets, adding an organic dye, heating and stirring the mixture to an elevated temperature of from 40° C. to 90° C., continuing stirring at said temperature until said droplets become colored, solid, substantially spherical hard beads containing essentially crosslinked organopolysiloxane and said dye.

2. The method of claim 1 wherein the silane component is methyltriethoxysilane.

3. The method of claim 1 wherein the silane component is ethyltriethoxysilane.

4. The method of claim 1 wherein the silane component is vinyltriethoxysilane.

5. The method of claim 1 wherein the silane component is allyltrimethoxysilane.

6. The method of claim 1 wherein the pH of the aqueous medium admixed with said organotrialkoxysilane is acidic to litmus by the presence of hydrochloric acid, the initial mixing temperature above 30° C. is 65° C., the cooling step of the clear mixture is cooling to room temperature, the base added to change the pH is triethylamine in an amount to make the mixture basic to litmus, the organic dye is fluorescein and the elevated temperature to which the mixture is heated after addition of the dye is 70° C.

7. The process of claim 6 wherein the organotrialkoxysilane is methyltriethoxysilane.

8. The colored, solid, substantially spherical hard particles formed by the method described in claim 1.

References Cited by the Examiner

UNITED STATES PATENTS

| | | | |
|---|---|---|---|
| 2,652,386 | 9/1953 | Wallman | 264—14 XR |
| 2,832,794 | 4/1958 | Gordon | 260—46.5 XR |
| 2,910,495 | 10/1959 | George | 252—301.2 XR |
| 2,935,481 | 5/1960 | Hochwalt | 252—301.3 |
| 3,030,870 | 4/1962 | Gill | 252—301.2 XR |

JULIUS GREENWALD, *Primary Examiner.*

R. D. LOVERING, *Assistant Examiner.*